(12) United States Patent
Kao et al.

(10) Patent No.: US 9,049,333 B2
(45) Date of Patent: Jun. 2, 2015

(54) OPTICAL DETECTING DEVICE AND RELATED METHOD OF SYNCHRONIZATION ADJUSTMENT

(71) Applicant: PixArt Imaging Inc., Hsin-Chu (TW)

(72) Inventors: Ming-Tsan Kao, Hsin-Chu (TW);
Hsin-Chi Cheng, Hsin-Chu (TW);
Yi-Hsien Ko, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/198,547

(22) Filed: Mar. 5, 2014

(65) Prior Publication Data

US 2014/0340721 A1    Nov. 20, 2014

(30) Foreign Application Priority Data

May 14, 2013    (TW) .............................. 102117051 A

(51) Int. Cl.
*H04N 1/04*        (2006.01)
*H04N 1/028*      (2006.01)

(52) U.S. Cl.
CPC ................................ *H04N 1/02815* (2013.01)

(58) Field of Classification Search
USPC .................................. 358/504, 509, 409, 475
See application file for complete search history.

(56) References Cited

U.S. PATENT DOCUMENTS

| 7,045,783 B2 | 5/2006 | Matveev |
| 2008/0176149 A1* | 7/2008 | Grimbergen ...................... 430/5 |
| 2013/0120252 A1* | 5/2013 | Lam et al. ..................... 345/157 |

FOREIGN PATENT DOCUMENTS

| CN | 101600056 B | 2/2012 |
| CN | 102789113 A | 11/2012 |
| WO | 03107650 A2 | 12/2003 |
| WO | 2007112431 A2 | 10/2007 |

* cited by examiner

*Primary Examiner* — Marcellus Augustin
(74) *Attorney, Agent, or Firm* — Winston Hsu; Scott Margo

(57) ABSTRACT

A method of synchronization adjustment is applied to an optical detecting device, so as to synchronize an exposure timing sequence of an image detector with a light emitting timing sequence of an indicating light source. The method includes acquiring a continued image set, analyzing intensity of each image of the continued image set, and adjusting the exposure timing sequence according to duty cycle of the image detector and intensity ratio of at least two images. An exposure frequency of the image detector is greater than a flickering frequency of the indicating light source.

30 Claims, 7 Drawing Sheets

OPTICAL DETECTING DEVICE AND RELATED METHOD OF SYNCHRONIZATION ADJUSTMENT

BACKGROUND OF THE INVENTION

1. Field of the Invention

The present invention relates to an optical detecting device, and more particularly, to an optical detecting device capable of tracing a light emitting timing sequence of an active reference light source and a related method of synchronization adjustment.

2. Description of the Prior Art

For eliminating effect of background noise, a conventional optical detecting device utilizes a reference light source with specific light emitting frequency to filter the background noise. The light emitting frequency of the reference light source is varied due to low energy of the built-in battery. Two conventional detection methods, such as synchronous flickering detection and asynchronous flickering detection, can be applied to the image detector for accurately acquiring the reference light source with the specific light emitting frequency. The conventional detection methods are set according to comparison between the exposure timing sequence of the image detector and the light emitting timing sequence of the reference light source. The conventional synchronous flickering detection method utilizes the optical detecting device to output a signal, and the signal is received by a receiver of the reference light source. The light emitting timing sequence of the reference light source is adjusted according to the signal receiving time, so as to synchronize with the exposure timing sequence of the image detector. However, the reference light source includes the extra signal receiver, and has drawbacks of expensive cost.

SUMMARY OF THE INVENTION

The present invention provides an optical detecting device capable of tracing a light emitting timing sequence of an active reference light source and a related method of synchronization adjustment for solving above drawbacks.

According to the claimed invention, a method of synchronization adjustment applied to an optical detecting device for synchronizing an exposure timing sequence of an image detector with a light emitting timing sequence of an indicating light source is disclosed. The method includes acquiring a continued image set, analyzing intensity of each image of the continued image set, and adjusting the exposure timing sequence according to intensity ratio of at least two images and a duty cycle of the image detector. An exposure frequency of the image detector is substantially greater than a flickering frequency of the indicating light source.

According to the claimed invention, analyzing the intensity of each image of the continued image set includes determining the intensity ratio of a fully illuminated image to an adjacent non-fully illuminated image of the continued image set.

According to the claimed invention, analyzing the intensity of each image of the continued image set includes determining the intensity ratio of a half illuminated image to a fully illuminated image of the continued image set.

According to the claimed invention, adjusting the exposure timing sequence includes varying an actuating time of the image detector for synchronizing the exposure timing sequence with the light emitting timing sequence.

According to the claimed invention, the method further includes decreasing the exposure frequency of the image detector according to predetermined modes when parts of the continued image set do not capture the indicating light source.

According to the claimed invention, the method further includes obtaining a duty cycle or a flickering period of the indicating light source according to time difference between a half illuminated image and the other half illuminated image of the continued image set, and adjusting the exposure timing sequence of the image detector according to the flickering period.

According to the claimed invention, the method further includes setting partial area on pixel array of the image detector, and amounting intensity of the pixels within the partial area.

According to the claimed invention, the intensity is a total intensity value or a mean intensity value of at least parts of pixels of each image.

According to the claimed invention, the method further includes comparing intensity of at least parts of pixels of each image to a threshold, and determining whether the image detector captures the indicating light source according to a comparison.

According to the claimed invention, the method further includes increasing the exposure frequency of the image detector when the image detector captures the indicating light source, executing the synchronization adjustment of the exposure timing sequence and the light emitting timing sequence, and decreasing the exposure frequency of the image detector when the exposure timing sequence and the light emitting timing sequence are in synchronization.

According to the claimed invention, the method further includes calculating an amount of the images that do not capture the indicating light source from the continued image set, and switching the image detector into a sleep mode when the amount is greater than a predetermined value.

According to the claimed invention, the duty cycle of the image detector is smaller than or equal to a duty cycle of the indicating light source.

According to the claimed invention, a method of synchronization adjustment applied to an optical detecting device for synchronizing an exposure timing sequence of an image detector with a light emitting timing sequence of an indicating light source is disclosed. The method includes shifting the exposure timing sequence according to a predetermined phase difference, acquiring a plurality of continued image sets, analyzing intensity of each image of each continued image set, and adjusting the image detector according to intensity variation of the adjacent images.

According to the claimed invention, the method further includes selecting the continued image set that has a fully dark image and a fully illuminated image adjacent to each other, and obtaining a result that the exposure timing sequence of the selected continued image set and the light emitting timing sequence are in synchronization.

According to the claimed invention, an optical detecting device for detecting an indicating light source is disclosed. The optical detecting device includes an image detector and a control unit. The image detector acquires a continued image set. The control unit is electrically connected to the image detector. The control unit analyzes intensity of each image of the continued image set, and adjusts an exposure timing sequence of the image detector according to intensity ratio of at least two images and a duty cycle of the image detector.

The present invention can determine the phase difference between the image detector and the indicating light source according to the intensity of the continued images, for automatic synchronization adjustment of the optical detecting device, so that the optical detecting device can accurately distinguish whether the stylus with the active luminosity function is located over the screen of the optical touch system, and can calculate the position and the movement of the stylus accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
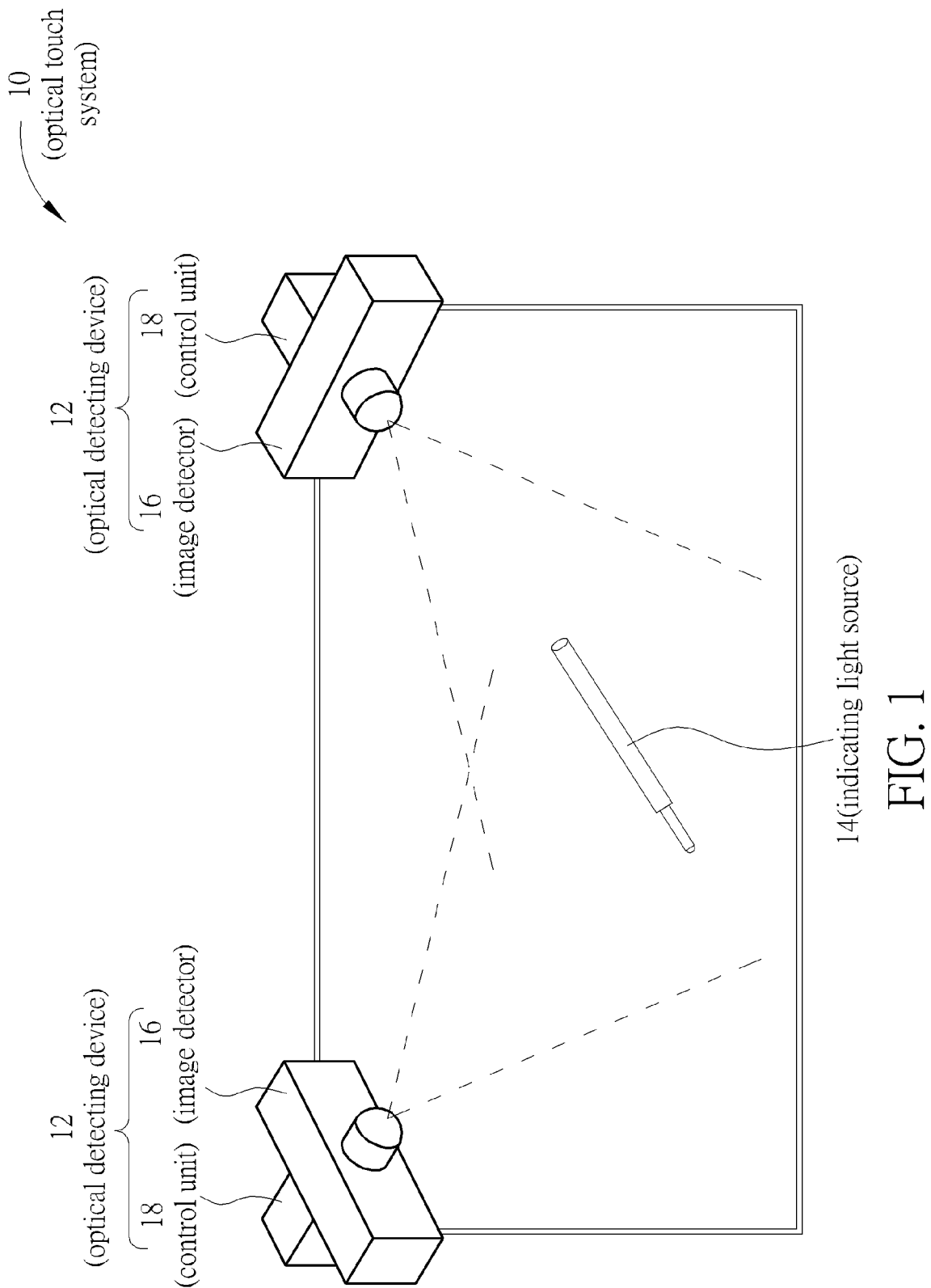
FIG. 1 is a diagram of an optical touch system according to an embodiment of the present invention.

Please refer to FIG. 1. FIG. 1 is a diagram of an optical touch system 10 according to an embodiment of the present invention. The optical touch system 10 includes an optical detecting device 12 and an indicating light source 14. The optical detecting device 12 can detect and trace intensity and movement of an optical signal from the indicating light source 14, so as to determine a control command inputted by the user via the indicating light source 14. The indicating light source 14 can be a stylus with active luminosity function. The optical detecting device 12 includes an image detector 16 and a control unit 18. The image detector 16 is disposed on corners of the screen of the optical touch system 10, and faces toward the screen to acquire a continued image set. The screen may have no reflector, or further may be laid by optical absorbent for providing uniformly dark background. The image detector 16 can detect variation of the optical signal outputted by the indicating light source 14 when the indicating light source 14 moves over the screen.

The control unit 18 is electrically connected to the image detector 16. A duty cycle and an exposure frequency (frequency of an exposure timing sequence) of the image detector 16 are known, a flickering frequency (frequency of a light emitting timing sequence) of the indicating light source 14 are decreased due to energy decay of the built-in battery of the stylus, so that the optical detecting device 12 of the present invention can utilize the control unit 18 to immediately analyze the intensity of each image of the continued image set, and to adjust the exposure timing sequence of the image detector 16 according to intensity ratio of at least two images and the duty cycle of the image detector 16. The exposure timing sequence of the image detector 16 can be adjusted to be synchronous with the light emitting timing sequence of the indicating light source 14, and the optical detecting device 12 can accurately detect the movement of the indicating light source 14.

Generally, one optical detecting device 12 can include at least one image detector 16 and one control unit 18. The optical touch system 10 can include one or more optical detecting devices 12 respectively disposed on corners or edges of the screen. As the optical touch system 10 includes a plurality of optical detecting devices 12, one control unit 18 can be used to control the plurality of optical detecting devices 12. The single control unit 18 may be independent of the whole optical detecting devices 12, or may be disposed inside one of the optical detecting devices 12. The optical detecting device 12 actuates all the image detectors 16 to detect the indicating light source 14, and the image detector 16 calculates position of the stylus according to the captured images.

As the image detector 16 does not capture the indicating light source 14, the optical detecting device 12 is switched into a sleep mode for energy economy. During the sleep mode, the control unit 18 only actuates one of the image detectors 16 to detect the indicating light source 14; meanwhile, the actuated image detector 16 detects whether the stylus exists, without position calculation, and the control unit 18 can execute synchronization adjustment according to variation of the optical signal of the indicating light source 14.

Further, at least one of the image detectors 16 of the optical touch system 10 can have a first operation mode and a second operation mode. The exposure frequency of the first operation mode is substantially greater than the exposure frequency of the second operation mode. During a normal mode of the optical detecting device 12, the control unit 18 switches the plurality of image detectors 16 into the second operation mode, and the image detectors 16 detect the variation of the optical signal of the indicating light source 14 for the position calculation. When the optical detecting device 12 enters the sleep mode, most of the image detectors 16 are shut down, and only single image detector 16 is actuated by the control unit 18 for the energy economy. The control unit 18 switches the actuated image detector 16 into the first operation mode for the synchronization adjustment. Because the exposure frequency of the first operation mode is greater than the flickering frequency of the indicating light source 14, the synchronization adjustment of the optical detecting device 12 can be executed rapidly, to fit in with the consumer demand.

Figure 2:
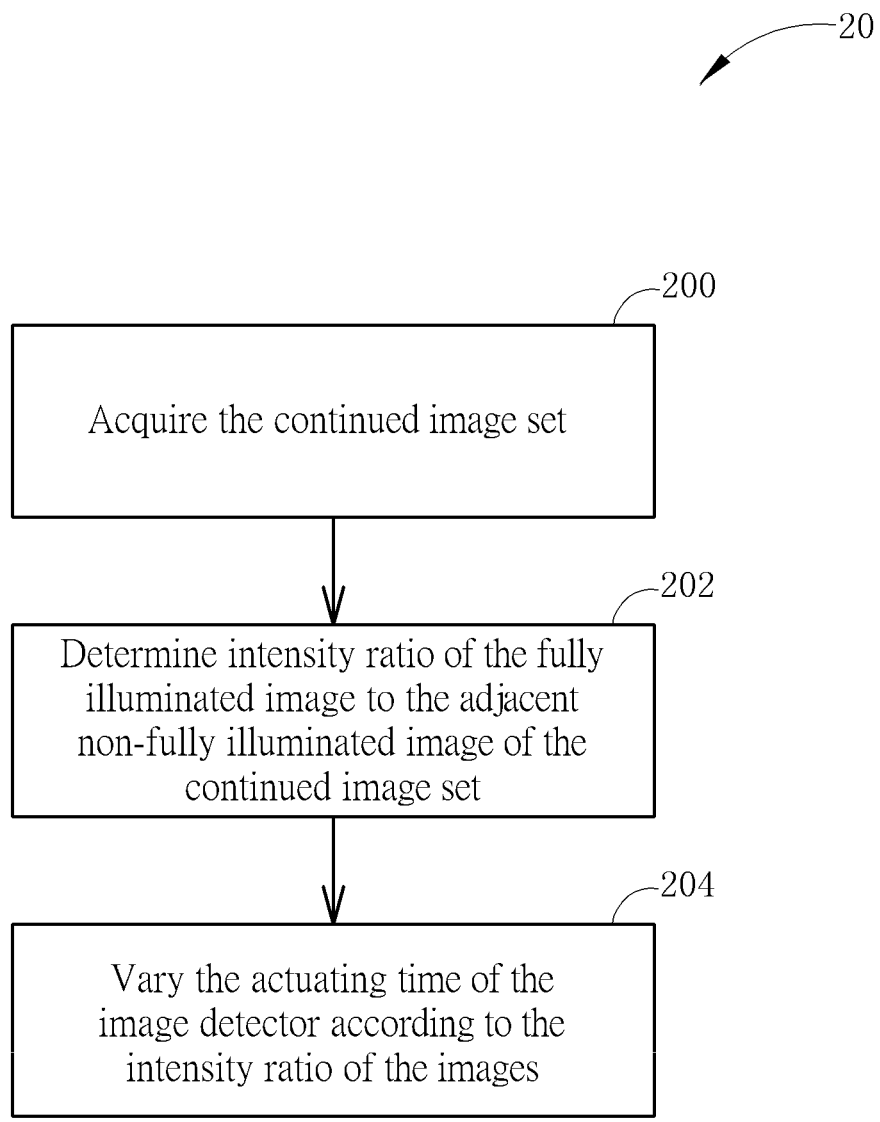
FIG. 2 is a flow chart of a method of the synchronization adjustment according to the embodiment of the present invention.
Figure 3:
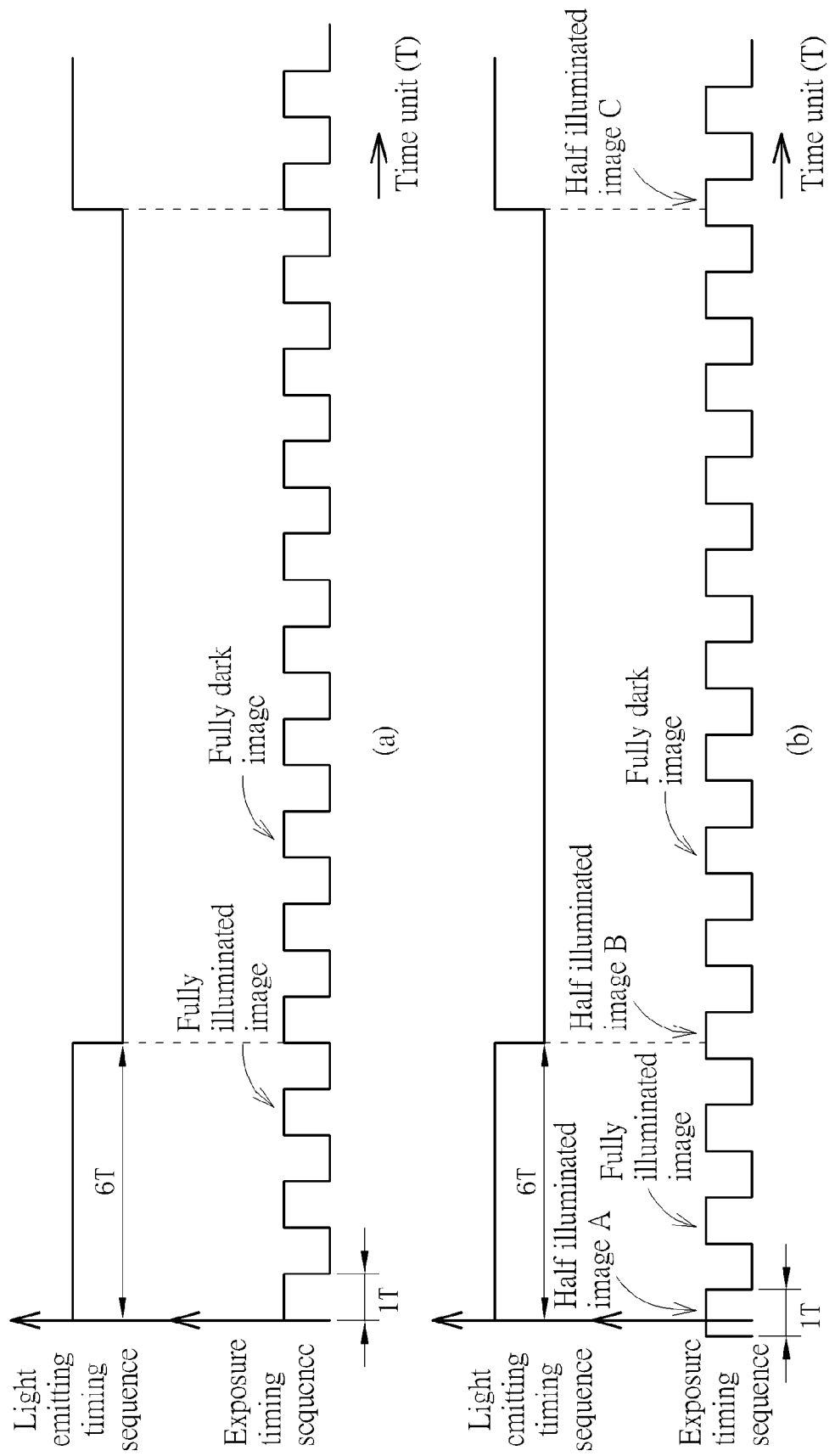
FIG. 3 is a diagram of timing sequence comparison of the indicating light source and the image detector according to the embodiment of the present invention.

Please refer to FIG. 2 and FIG. 3. FIG. 2 is a flow chart of a method of the synchronization adjustment according to the embodiment of the present invention. FIG. 3 is a diagram of timing sequence comparison of the indicating light source 14 and the image detector 16 according to the embodiment of the present invention. Method illustrated in FIG. 2 is suitable for the optical detecting device 12 shown in FIG. 1. The flickering frequency of the indicating light source 14 are decreased according to predetermined modes due to the energy decay of the built-in battery of the stylus, so that the optical detecting device 12 detects whether the exposure timing sequence of the image detector 16 is synchronous with the light emitting timing sequence of the indicating light source 14, and then execute the synchronization adjustment as follow steps when the exposure timing sequence and the light emitting timing sequence are not in synchronization.

First, step 200 is executed to utilize the image detector 16 to acquire the continued image set. Then, step 202 is executed that the control unit 18 determines the intensity ratio of a fully illuminated image to an adjacent non-fully illuminated image of the continued image set. Final, step 204 is execute and the control unit 18 varies an actuating time of the image detector 16 according to the intensity ratio of the two images, so as to synchronize the exposure timing sequence of the image detector 16 with the light emitting timing sequence of the indicating light source 14.

As shown in FIG. 3, the exposure frequency of the image detector 16 is substantially greater than the flickering frequency of the indicating light source 14, and the duty cycle of the image detector 16 is substantially smaller than the duty cycle of the indicating light source 14. In FIG. 3(a), the continued image set includes the fully illuminated images and the fully dark images, so that the control unit 18 obtains a result that the exposure timing sequence and the light emitting timing sequence are in synchronization. Three fully illuminated images are generated during the duty cycle (such as 6 T) of the indicating light source 14.

In FIG. 3(b), the exposure timing sequence and the light emitting timing sequence are not in synchronization, the continued image set includes the fully illuminated images, the non-fully illuminated images and the fully dark images. The control unit 18 can select one of the non-fully illuminated images to determine the intensity ratio of the non-fully illuminated image to the fully illuminated image. For example, the intensity ratio of the half illuminated image to the fully illuminated image is 60%, the duty cycle (such as 1 T) of the image detector 16 multiplied by the intensity ratio (60%) is phase difference between the exposure timing sequence and the light emitting timing sequence. Therefore, the control unit 18 can vary the actuating time of the image detector 16 according to the calculated phase difference to synchronize the exposure timing sequence with the light emitting timing sequence.

Figure 4:
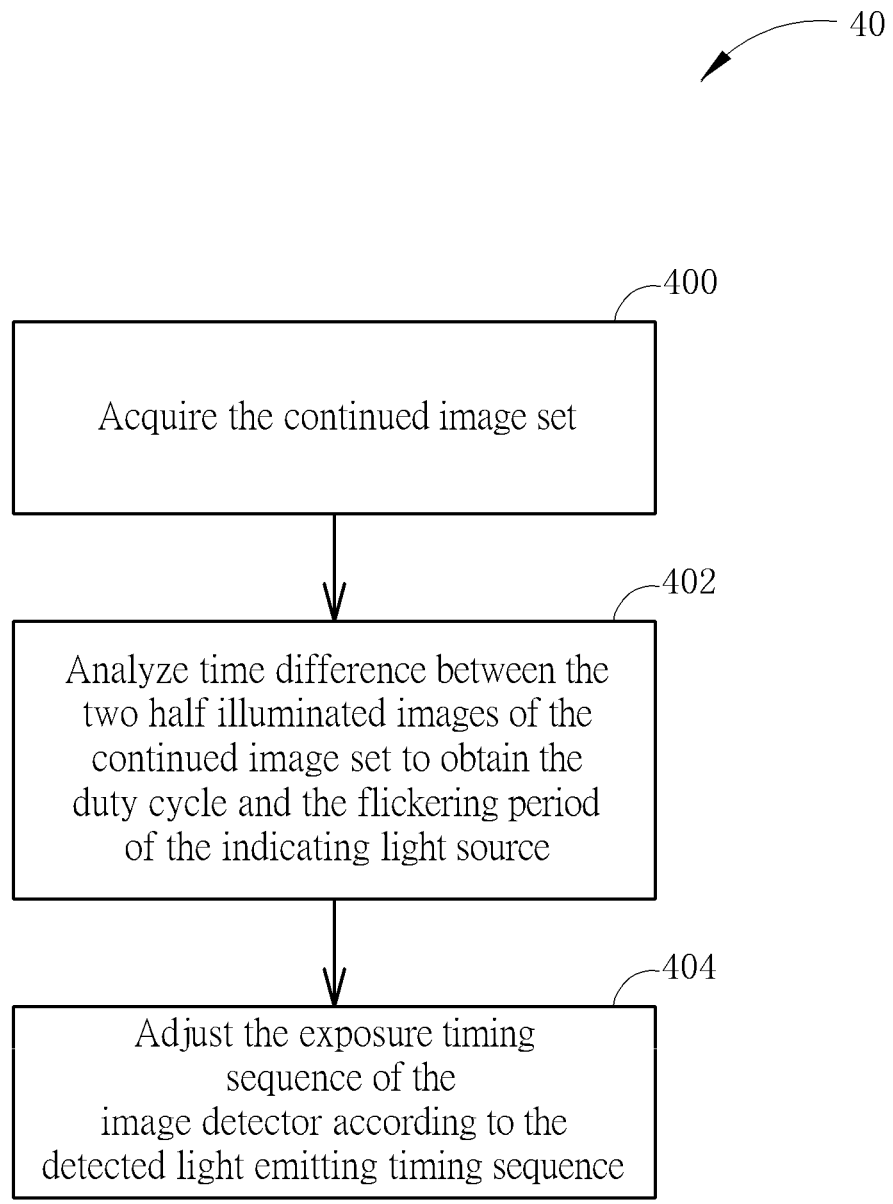
FIG. 4 is a flow chart of a method of timing sequence detection according to an embodiment of the present invention.

The optical detecting device 12 of the present invention further can be applied to the indicating light source 14 with unknown flickering frequency. Please refer to FIG. 3 and FIG. 4. FIG. 4 is a flow chart of a method of timing sequence detection according to an embodiment of the present invention. Method illustrated in FIG. 4 is suitable for the optical detecting device 12 shown in FIG. 1. First, step 400 is executed to utilize the image detector 16 to acquire the continued image set. Then, step 402 is executed and the control unit 18 can analyze time difference between one half illuminated image and the other half illuminated image of the continued image set to obtain the duty cycle or the flickering period (an inverse proportion of the flickering frequency) of the indicating light source 14.

As shown in FIG. 3(b), the time difference between the half illuminate image A and the half illuminate image B is equal to the duty cycle of the indicating light source 14, and the time difference between the half illuminate image A and the half illuminate image C is equal to the flickering period of the indicating light source 14. Final, step 404 is executed that the control unit 18 can adjust the exposure timing sequence of the image detector 16 according to the detected light emitting timing sequence (calculated by the flickering period). The exposure frequency is preferably an integral multiple of the flickering frequency for the synchronization adjustment shown in FIG. 2.

When the optical detecting device 12 executes the synchronization adjustment, the control unit 18 determines whether the stylus (the indicating light source 14) exists, without the position calculation, for preferred operational efficiency. During the sleep mode, the control unit 18 compares an intensity amount of at least parts of pixels (such as one to three pixels) of each image to a predetermined threshold. As the intensity amount is lower than the predetermined threshold, the stylus does not exist, and the optical detecting device 12 is set at the sleep mode. As the intensity amount is greater than the predetermined threshold, the stylus is located inside detection range of the image detector 16, the control unit 18 switches the image detector 16 into the first operation mode, and the optical detecting device 12 is out of the sleep mode to execute the synchronization adjustment.

In the first operation mode, the control unit 18 can set the image detector 16 to utilize partial area on the pixel array to detect the optical signal. For example, the control unit 18 can set the two pixel rows adjacent to the screen to be the partial area when the image detector 16 faces toward the screen. Then, the control unit 18 amounts the intensity (such as the total intensity value or the mean intensity value) of the whole pixels within the partial area, which means each image has an intensity value, and obtains the intensity ratio of the images of the continued image set for the synchronization adjustment. Thus, the optical detecting device 12 can reduce the energy consumption and increase the operational efficiency of image process.

Figure 5:
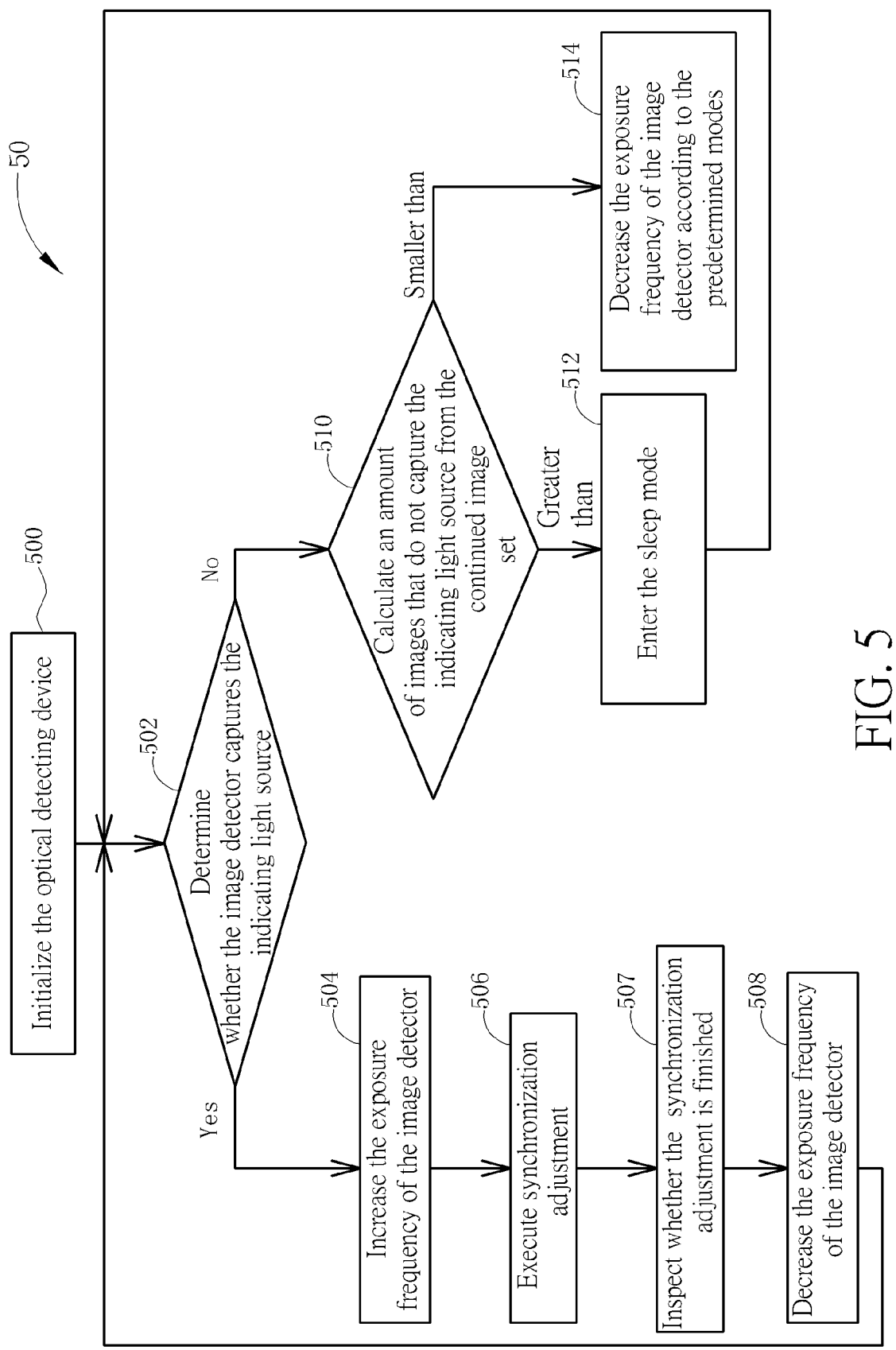
FIG. 5 is a flow chart of operating the optical detecting device according to the embodiment of the present invention.

Please refer to FIG. 5. FIG. 5 is a flow chart of operating the optical detecting device 12 according to the embodiment of the present invention. The operation method illustrated in FIG. 5 is suitable for the optical detecting device 12 shown in FIG. 1. First, step 500 is executed, and the optical detecting device 12 is initialized to actuate the image detector 16. Then, step 502 is executed that the control unit 18 determines whether the image detector 16 captures the indicating light source 14. Step 504 is executed when the image detector 16 captures the indicating light source 14, the control unit 18 increases the exposure frequency of the image detector 16, which means the image detector 16 is switched into the first operation mode, to speed the synchronization adjustment by high frequency scan.

Then, steps 506 and 507 are executed for the synchronization adjustment shown in FIG. 2 and FIG. 3. The control unit 18 has to inspect a phase of the optical signal outputted by the indicating light source 14, to ensure that the synchronization adjustment of the exposure timing sequence of the image detector 16 and the light emitting timing sequence of the indicating light source 14 is completed. Final, step 508 is executed to decrease the exposure frequency of the image detector 16 by the control unit 18 after the exposure timing sequence and the light emitting timing sequence are in synchronization, which means the image detector 16 is switched into the second operation mode. The optical detecting device 12 can detect the position of the stylus (the indicating light source 14). As the optical detecting device 12 does not detect the optical signal of the indicating light source 14, the optical detecting device 12 drives the image detector 16 to search the indicating light source 14, and step 502 is executed to determine whether the image detector 16 captures the indicating light source 14.

When the control unit 18 determines that the image detector 16 does not capture the indicating light source 14, step 510 is executed to calculate an amount of images that do not capture the indicating light source 14 from the continued image set by the control unit 18. As the amount of the images that do not capture the indicating light source 14 is greater than a predetermined value, such as a series of the sequential images being the dark illuminated images, step 512 is executed, the control unit 18 determines that the stylus (the indicating light source 14) does not exist and switches the image detector 16 into the sleep mode. When the image detector 16 is awaken from the sleep mode, the optical detecting device 12 can execute step 502 to immediately actuate the position detection of the stylus (the indicating light source 14).

As the amount of the images that do not capture the indicating light source 14 is less than the predetermined value, only parts of the continued image set does not capture the indicating light source 14; meanwhile, the control unit 18 can determine that the exposure timing sequence of the image detector 16 and the light emitting timing sequence of the indicating light source 14 are not in synchronization. Then, step 514 is executed to decrease the exposure frequency of the image detector 16 according to the predetermined modes by the control unit 18, so as to execute the synchronization adjustment of the image detector 16 and the indicating light source 14 as the above-mentioned method.

Figure 6:
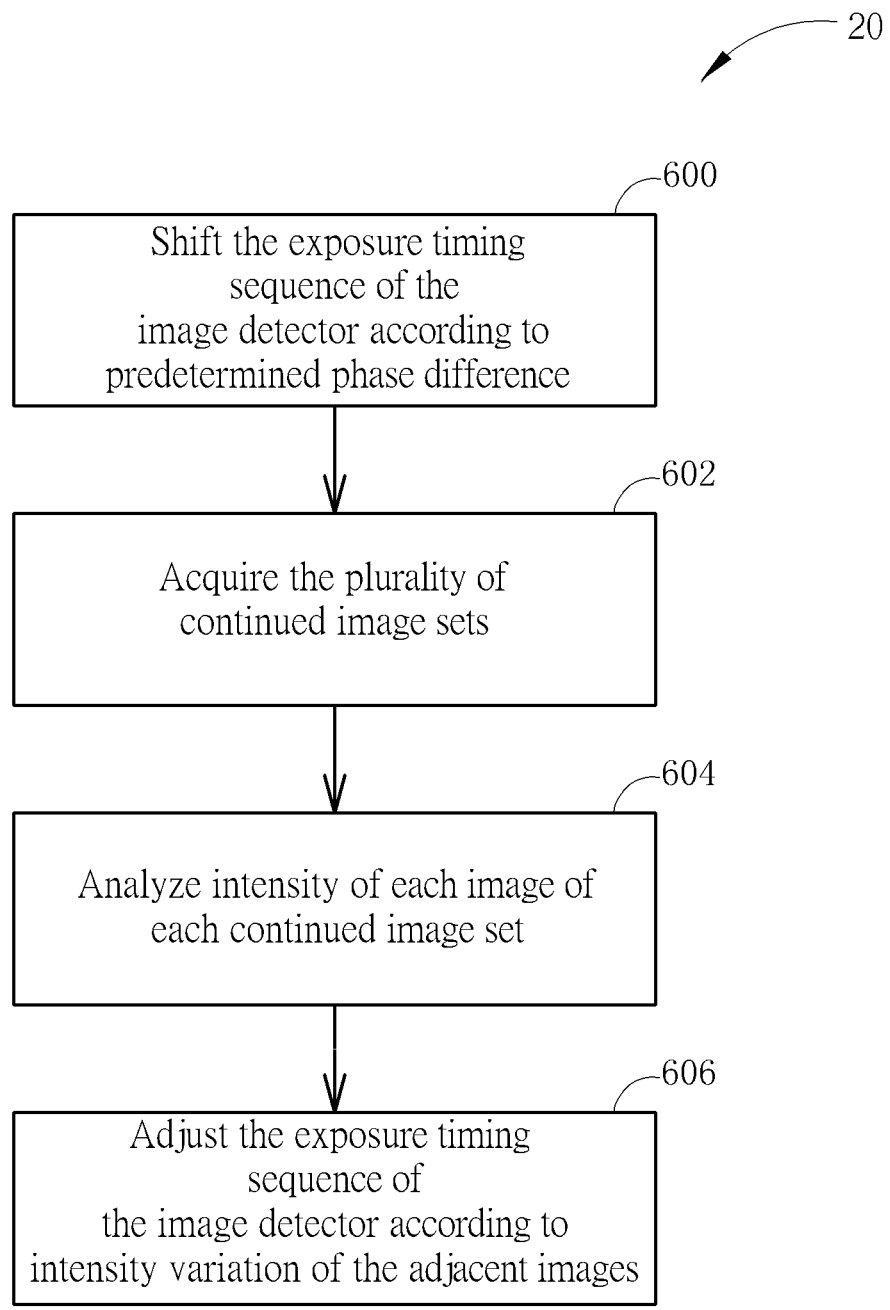
FIG. 6 is a flow chart of a method of the synchronization adjustment according to the other embodiment of the present invention.

Please refer to FIG. 6. FIG. 6 is a flow chart of a method of the synchronization adjustment according to the other embodiment of the present invention. Method illustrated in FIG. 6 is suitable for the optical detecting device 12 shown in FIG. 1. First, step 600 is executed that the control unit 18 shifts the exposure timing sequence of the image detector 16 according to the predetermined phase difference. Then, step 602 is executed that the image detector 16 acquires the plurality of continued image set after each phase shift. Then, step 604 is executed to analyze the intensity of each image of each continued image set by the control unit 18, so as to select one of the continued image sets that includes the fully dark image and the fully illuminated image adjacent to each other.

Thus, the control unit 18 can obtain the result that the exposure timing sequence of the selected continued image set are synchronous with the light emitting timing sequence of the indicating light source 14. Final, step 606 is executed that the control unit 18 can adjust the exposure timing sequence of the image detector 16 according to intensity variation of the adjacent images for synchronizing the exposure timing sequence with the light emitting timing sequence of the reference light source 14. In this embodiment, the exposure frequency of the image detector 16 is preferably greater than the flickering frequency of the indicating light source 14, and the image detector 16 can execute the synchronization adjustment rapidly by the high frequency scan.

Figure 7:
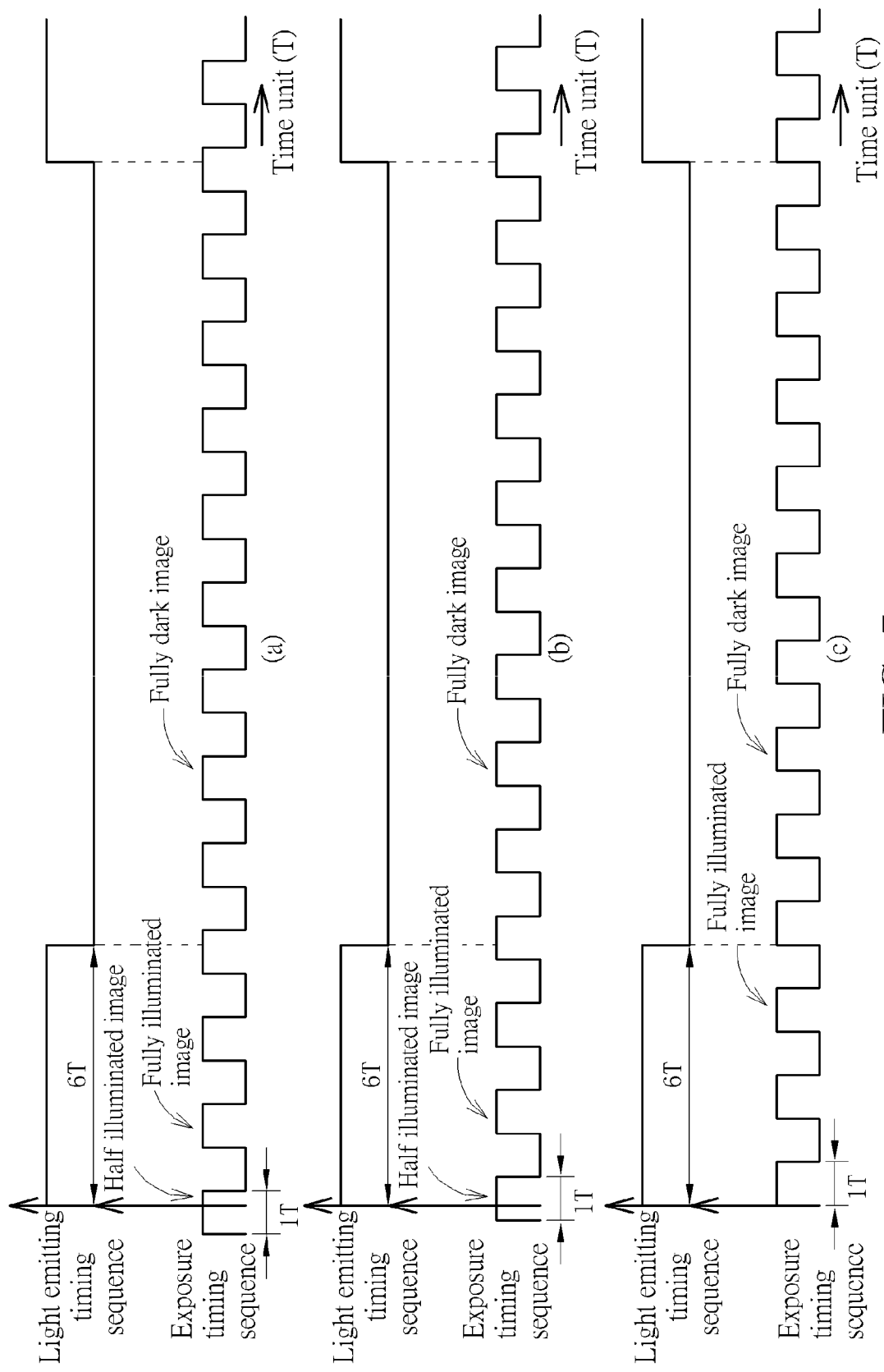
FIG. 7 is a diagram of timing sequence comparison of the indicating light source and the image detector shown in FIG. 6.

Please refer to FIG. 7. FIG. 7 is a diagram of timing sequence comparison of the indicating light source 14 and the image detector 16 shown in FIG. 6. The control unit 18 can vary the actuating time of the image detector 16 according to the predetermined phase difference, such as one-third time unit (T), to generate three different examples shown in FIG. 7. In FIG. 7(a) and FIG. 7(b), the exposure timing sequence of the image detector 16 and the light emitting timing sequence of the indicating light source 14 are not in synchronization, so that the continued image set acquired by the image detector 16 includes the fully illuminated images, the half illuminated images and the fully dark images, and the half illuminated image is located between the fully illuminated image and the fully dark image.

In FIG. 7 (c), the exposure timing sequence of the image detector 16 and the light emitting timing sequence of the indicating light source 14 are in synchronization, the continued image set acquired by the image detector 16 includes the fully illuminated images and the fully dark images. The control unit 18 can determine that the exposure timing sequence, which corresponds to the continued image set only including the fully illuminated images and the fully dark images, is synchronous with the light emitting timing sequence, and the control unit 18 can drive the image detector 16 to acquire the images in the synchronization according to the above-mentioned parameter (the predetermined phase difference). The duty cycle of the image detector 16 is preferably smaller than the duty cycle of the indicating light source 14, so that the image detector 16 can rapidly acquire plenty of images when the indicating light source 14 is luminous.

In conclusion, the optical detecting device of the present invention can detect parameters of the indicating light source when the duty cycle and the exposure frequency of the indicating light source are unknown, or can rapidly execute the synchronization adjustment of the exposure timing sequence of the image detector and the light emitting timing sequence of the indicating light source when the duty cycle and the exposure frequency of the indicating light source are known. The image detector can acquire the plurality of continued image sets for intensity comparison by the control unit, the duty cycle and the exposure period of the indicating light source can be determined by intervals between the half illuminated images.

As the duty cycle and the exposure frequency of the indicating light source are known, the optical detecting device can utilize single continued image set to complete the synchronization adjustment. The image detector acquires the continued image set, and the control unit analyzes the intensity ratio of the half illuminated image to the fully illuminated image of the continued image set for determining the phase difference between the exposure timing sequence of the image detector and the light emitting timing sequence of the indicating light source. Therefore, the control unit can immediately vary the actuating time of the image detector to synchronize the image detector with the indicating light source.

Comparing to the prior art, the present invention can determine the phase difference between the image detector and the indicating light source according to the intensity of the continued images, for automatic synchronization adjustment of the optical detecting device, so that the optical detecting device can accurately distinguish whether the stylus with the active luminosity function is located over the screen of the optical touch system, and can calculate the position and the movement of the stylus accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of synchronization adjustment applied to an optical detecting device for synchronizing an exposure timing sequence of an image detector with a light emitting timing sequence of an indicating light source, the method comprising:

acquiring a continued image set;

analyzing intensity of each image of the continued image set;

adjusting the exposure timing sequence according to intensity ratio of at least two images and a duty cycle of the image detector;

comparing intensity of at least parts of pixels of each image to a threshold;

determining whether the image detector captures the indicating light source according to a comparison;

increasing an exposure frequency of the image detector when the image detector captures the indicating light source;

executing the synchronization adjustment of the exposure timing sequence and the light emitting timing sequence; and decreasing the exposure frequency of the image detector when the exposure timing sequence and the light emitting timing sequence are in synchronization;

wherein the exposure frequency of the image detector is substantially greater than a flickering frequency of the indicating light source.

2. The method of claim 1, wherein analyzing the intensity of each image of the continued image set comprises:
determining the intensity ratio of a fully illuminated image to an adjacent non-fully illuminated image of the continued image set.

3. The method of claim 1, wherein analyzing the intensity of each image of the continued image set comprises:
determining the intensity ratio of a half illuminated image to a fully illuminated image of the continued image set.

4. The method of claim 1, wherein adjusting the exposure timing sequence comprises:
varying an actuating time of the image detector to synchronize the exposure timing sequence with the light emitting timing sequence.

5. The method of claim 1, further comprising:
decreasing the exposure frequency of the image detector according to predetermined modes when parts of the continued image set do not capture the indicating light source.

6. The method of claim 1, further comprising:
obtaining a duty cycle or a flickering period of the indicating light source according to time difference between a half illuminated image and the other half illuminated image of the continued image set; and
adjusting the exposure timing sequence of the image detector according to the flickering period.

7. The method of claim 1, further comprising:
setting partial area on pixel array of the image detector; and
amounting intensity of the pixels within the partial area.

8. The method of claim 1, wherein the intensity is a total intensity value or a mean intensity value of at least parts of pixels of each image.

9. The method of claim 1, further comprising:
calculating an amount of the images that do not capture the indicating light source from the continued image set; and
switching the image detector into a sleep mode when the amount is greater than a predetermined value.

10. The method of claim 1, wherein the duty cycle of the image detector is smaller than or equal to a duty cycle of the indicating light source.

11. A method of synchronization adjustment applied to an optical detecting device for synchronizing an exposure timing sequence of an image detector with a light emitting timing sequence of an indicating light source, the method comprising:
shifting the exposure timing sequence according to a predetermined phase difference;
acquiring a plurality of continued image sets;
analyzing intensity of each image of each continued image set;
adjusting the image detector according to intensity variation of the adjacent images;
selecting the continued image set that has a fully dark image and a fully illuminated image adjacent to each other; and
obtaining a result that the exposure timing sequence of the selected continued image set and the light emitting timing sequence are in synchronization.

12. The method of claim 11, wherein a duty cycle of the image detector is smaller than or equal to a duty cycle of the indicating light source.

13. An optical detecting device for detecting an indicating light source, the optical detecting device comprising:

an image detector for acquiring a continued image set; and
a control unit electrically connected to the image detector, the control unit analyzing intensity of each image of the continued image set, and adjusting an exposure timing sequence of the image detector according to intensity ratio of at least two images and a duty cycle of the image detector;
wherein an exposure frequency of the image detector is greater than a flickering frequency of the indicating light source, the control unit further obtains a duty cycle or a flickering period of the indicating light source according to time difference between a half illuminated image and the other half illuminated image of the continued image set, so as to adjust the exposure timing sequence of the image detector accordingly.

14. The optical detecting device of claim 13, wherein the control unit determines the intensity ratio of a fully illuminated image to an adjacent non-fully illuminated image of the continued image set, and the intensity ratio of a half illuminated image to a fully illuminated image of the continued image set.

15. The optical detecting device of claim 13, wherein the control unit varies an actuating time of the image detector to synchronize the exposure timing sequence with a light emitting timing sequence of the indicating light source.

16. The optical detecting device of claim 13, wherein the control unit further decreases the exposure frequency of the image detector according to predetermined modes when parts of the continued image set do not capture the indicating light source.

17. The optical detecting device of claim 13, wherein the control unit further sets partial area on pixel array of the image detector, and amounts intensity of the pixels within the partial area, so as to obtain a total intensity value or a mean intensity value of each image.

18. The optical detecting device of claim 13, wherein the control unit further compares the intensity of at least parts of pixels of each image to a threshold, so as to determine whether the image detector captures the indicating light source.

19. The optical detecting device of claim 18, wherein the image detector captures the indicating light source, the control unit increases the exposure frequency of the image detector to synchronize the exposure timing sequence with the light emitting timing sequence, and further decreases the exposure frequency after synchronization is adjusted.

20. The optical detecting device of claim 18, wherein the control unit calculates an amount of the images that do not capture the indicating light source from the continued image set, and switches the image detector into a sleep mode when the amount is greater than a predetermined value.

21. The optical detecting device of claim 13, wherein the image detector comprises a first operation mode and a second operation mode, an exposure frequency of the first operation mode is greater than an exposure frequency of the second operation mode, the control unit switches the image detector into the first operation mode for the synchronization adjustment, and then switches the image detector into the second operation mode after synchronization is adjusted.

22. The optical detecting device of claim 13, wherein the optical detecting device further comprises a plurality of image detectors, the control unit actuates one of the image detectors for the synchronization adjustment when the optical detecting device is in a sleep mode, and further actuates the whole image detectors to detect the indicating light source when the optical detecting device is not in the sleep mode.

23. The optical detecting device of claim 13, wherein the control unit further shifts the exposure timing sequence of the image detector according to a predetermined phase difference for respectively acquiring a plurality of continued image sets, and analyzes intensity of each image of each continued image set, so as to adjust the image detector according to intensity variation of the adjacent images.

24. The optical detecting device of claim 23, wherein the control unit further selects the continued image set that has a fully dark image and a fully illuminated image adjacent to each other, and obtains a result that the exposure timing sequence of the selected continued image set and the light emitting timing sequence are in synchronization.

25. The optical detecting device of claim 13, wherein the duty cycle of the image detector is smaller than or equal to a duty cycle of the indicating light source.

26. A method of synchronization adjustment applied to an optical detecting device for synchronizing an exposure timing sequence of an image detector with a light emitting timing sequence of an indicating light source, the method comprising:
   acquiring a continued image set;
   analyzing intensity of each image of the continued image set;
   adjusting the exposure timing sequence according to intensity ratio of at least two images and a duty cycle of the image detector;
   comparing intensity of at least parts of pixels of each image to a threshold;
   determining whether the image detector captures the indicating light source according to a comparison;
   calculating an amount of the images that do not capture the indicating light source from the continued image set; and
   switching the image detector into a sleep mode when the amount is greater than a predetermined value;
   wherein an exposure frequency of the image detector is substantially greater than a flickering frequency of the indicating light source.

27. An optical detecting device for detecting an indicating light source, the optical detecting device comprising:
   an image detector for acquiring a continued image set; and
   a control unit electrically connected to the image detector, the control unit analyzing intensity of each image of the continued image set, and adjusting an exposure timing sequence of the image detector according to intensity ratio of at least two images and a duty cycle of the image detector;
   wherein an exposure frequency of the image detector is greater than a flickering frequency of the indicating light source, the control unit further compares the intensity of at least parts of pixels of each image to a threshold so as to determine whether the image detector captures the indicating light source, the control unit further calculates an amount of the images that do not capture the indicating light source from the continued image set and switches the image detector into a sleep mode when the amount is greater than a predetermined value.

28. An optical detecting device for detecting an indicating light source, the optical detecting device comprising:
   an image detector for acquiring a continued image set; and
   a control unit electrically connected to the image detector, the control unit analyzing intensity of each image of the continued image set, and adjusting an exposure timing sequence of the image detector according to intensity ratio of at least two images and a duty cycle of the image detector;
   wherein an exposure frequency of the image detector is greater than a flickering frequency of the indicating light source, the image detector comprises a first operation mode and a second operation mode, an exposure frequency of the first operation mode is greater than an exposure frequency of the second operation mode, the control unit switches the image detector into the first operation mode for the synchronization adjustment, and then switches the image detector into the second operation mode after synchronization is adjusted.

29. An optical detecting device for detecting an indicating light source, the optical detecting device comprising:
   an image detector for acquiring a continued image set; and
   a control unit electrically connected to the image detector, the control unit analyzing intensity of each image of the continued image set, and adjusting an exposure timing sequence of the image detector according to intensity ratio of at least two images and a duty cycle of the image detector;
   wherein an exposure frequency of the image detector is greater than a flickering frequency of the indicating light source, the optical detecting device further comprises a plurality of image detectors, the control unit actuates one of the image detectors for the synchronization adjustment when the optical detecting device is in a sleep mode, and further actuates the whole image detectors to detect the indicating light source when the optical detecting device is not in the sleep mode.

30. An optical detecting device for detecting an indicating light source, the optical detecting device comprising:
   an image detector for acquiring a continued image set; and
   a control unit electrically connected to the image detector, the control unit analyzing intensity of each image of the continued image set, and adjusting an exposure timing sequence of the image detector according to intensity ratio of at least two images and a duty cycle of the image detector;
   wherein an exposure frequency of the image detector is greater than a flickering frequency of the indicating light source, the control unit further shifts the exposure timing sequence of the image detector according to a predetermined phase difference for respectively acquiring a plurality of continued image sets, and analyzes intensity of each image of each continued image set, so as to adjust the image detector according to intensity variation of the adjacent images.

* * * * *